Patented Feb. 6, 1940

2,189,655

UNITED STATES PATENT OFFICE 2,189,655

CONVERSION OF HYDROCARBONS

Robert F. Ruthruff, Nutley, N. J., assignor, by mesne assignments, to The Polymerization Process Corporation, Jersey City, N. J., a corporation of Delaware No Drawing. Application September 15, 1938, Serial No. 230,018

8 Claims. (Cl. 196—10)

This invention relates to the conversion of olefinic hydrocarbons to hydrocarbons of higher boiling points. More particularly, the invention relates to the conversion of low-boiling olefinic hydrocarbons, particularly normally gaseous hydrocarbons, to hydrocarbons of higher boiling points to produce a motor fuel of high anti-knock value.

It has been suggested to effect conversion of olefinic hydrocarbons to higher boiling hydrocarbons by polymerization thereof in contact with a catalyst consisting of acids of pentavalent phosphorus as such or in the form of free acid in solid bodies made by treating a solid material such as diatomaceous earth with a phosphoric acid. It has also been suggested to employ certain metal orthophosphates in admixture with orthophosphoric acid to form a catalyst containing varying proportions of free orthophosphoric acid.

In connection with the present invention it has been discovered that superior results in the polymerization of olefinic hydrocarbons may be obtained by the use of a phosphate catalyst in which copper pyrophosphate is an active ingredient.

Any suitable method may be used for the preparation of the new catalyst, such as the ignition of the monohydrogen orthophosphate. However, it has been found that the preparation of a catalyst for use in the present invention may be effected most conveniently by the formation of the copper pyrophosphate directly by metathesis. A suitable copper salt and sodium pyrophosphate may be reacted in solution to effect precipitation of copper pyrophosphate. For example, an 0.2 molar solution of sodium pyrophosphate may be added to an 0.2 molar solution of the copper salt such as copper acetate or copper sulfate; the sodium pyrophosphate being added in an amount about 10% in excess of the equivalent amount. Addition is carried out gradually, and the reaction mixture is stirred during the addition. Specifically, a sodium pyrophosphate solution made by dissolving 122.2 grams of sodium pyrophosphate decahydrate in 1375 cc. of water may be added to a copper solution made by dissolving 100 grams of copper acetate dihydrate, or 125 grams of copper sulfate pentahydrate, in 2500 cc. of water during a period of about one-half hour. The precipitate is filtered off, washed thoroughly with water, dried and formed into pellets as desired for use in the polymerization reactor. The catalysts thus prepared contain no free phosphoric acids.

It is to be understood that the above example merely illustrates one method of preparing a satisfactory copper pyrophosphate catalyst in a convenient manner, and that copper pyrophosphate catalysts prepared by other methods may be employed within the scope of the invention.

In carrying out the present invention the olefinic hydrocarbons or the mixture of hydrocarbons containing olefinic constituents are passed in contact with the catalyst in a suitable chamber or reactor, the reaction gases being suitably preheated for the reaction. Any suitable pressure may be used but it is preferable to employ relatively high pressures, for example, in excess of 150 pounds per square inch although the catalyst exhibits its polymerization activity at atmospheric pressure or below. As is well known to those skilled in the art, the rate of polymerization of olefinic hydrocarbons is a function of the concentration of these materials and accordingly, from economic considerations such reactions are best run at superatmospheric pressure.

The optimum operating temperature will depend somewhat upon the nature of the material under treatment and the product desired. For example, for the conversion of gaseous olefins such as butylenes a temperature of approximately 350° to 360° F. is advantageous for effecting maximum conversion to a product consisting essentially of gasoline motor fuel constituents.

The extent of reaction and the character of the liquid product are effected also by the length of time during which the charge remains in contact with the catalyst under the operating conditions, that is, the space velocity of the charge. In general the charge is passed over the catalyst at a rate of from 2 to 40 or more cubic feet of charge, measured as gas at standard conditions of temperature and pressure, per pound of catalyst per hour.

It is apparent that with any given charge the extent of reaction and the character of the product depend mainly upon the operating pressure, the operating temperature and the space velocity of the charge. It is apparent that many combinations of these variables will yield the desired amount and quality of product, but by reference to the accompanying general description and the specific examples those skilled in this art will be able to select satisfactory conditions for producing a desired result, without undue experimentation.

In initiating the polymerization reaction in the presence of copper pyrophosphate prepared in accordance with the foregoing example it is desirable gradually to increase the temperature of the reaction gases (and thus the temperature in the reactor) to a maximum which is substantially above the temperature selected for stabilized operation in order to initiate a substantial rate of conversion. Thereafter the temperature is lowered relatively rapidly to the temperature previously selected for optimum conversion conditions. In the initiation of a polymerization reaction it is desirable to increase the temperature in the reactor gradually to approximately 500° F. when treating normally gaseous olefins to effect polymerization thereof, particularly butylenes. For example, the temperature may be raised from approximately 300° F. to about 500° F. during a period of approximately 45 hours. At the appropriate maximum temperature mentioned the formation of polymers at a parid rate is initiated. Thereafter the temperature in the reactor may be reduced, for example, to 325–350° F. relatively rapidly. The reduction in temperature may be effected during a period of approximately 15 hours. If the temperature is maintained from the beginning of the operation at a temperature not greater than 350° F. it will be found that a much longer time is required to effect initiation of conversion of the olefins at a substantial rate. After initiation of the reaction, suitable cooling means are provided to remove the heat of reaction and assist in maintaining the desired temperature.

*Example I*

For an example of the use of this catalyst under specific operating conditions results obtained from two operations on a gas mixture containing 23.5% normal butenes and 10.8% iso-butenes may be referred to. After initiation of catalytic activity by means described previously the operating temperature was reduced to 325° F., the gas being passed over the catalyst under a pressure of 1400 pounds per square inch at a rate of 20 cubic feet, measured as gas at standard conditions of temperature and pressure, per pound of catalyst per hour (5.5 cc. liquid basis per hour per gram of catalyst). Over a test period of 24 hours duration the liquid polymer yield was 19.3% by weight based on the charge. The temperature was then increased to 345° F. and during a test period of 56 hours duration 22.9% by weight of polymer was produced, representing a 65% conversion of the olefins charged. The conversion rate was arbitrarily limited to this figure in order to obtain a product of desired characteristics.

If even more complete conversion of the olefins present had been desired in connection with the operation described under Example I this could have been accomplished by changing one or more of the variables of temperature, pressure and space velocity discussed previously. In the operation described in Example I this could be conveniently accomplished by raising the operating temperature slightly, for example, to 375°–400° F. or by reducing the space velocity slightly, or both.

*Example II*

For an example of the use of the catalyst under specific conditions on a gas charge consisting entirely of hydrocarbons containing three carbon atoms per molecule reference to a specific operation may be had. In this operation the charge contained 30% propylene by volume and was passed under a pressure of 1400 pounds per square inch over the catalyst at a rate of 10 cubic feet, measured as gas at standard conditions of temperature and pressure, per pound of catalyst per hour (2.5 cc. liquid basis per gram of catalyst per hour). After initiation of the reaction by the procedure previously described the temperature was established at 400°–425° F. and a polymer yield of 25% by weight was obtained, 97% of which boiled in the gasoline boiling range. By this operation 85% of the propylene present was converted to liquid polymer in a single pass.

As mentioned above, the extent of conversion is affected by the above-mentioned variables of temperature, pressure and space velocity. The character of the liquid product is affected also by these variables in respect to its boiling point and in respect to its octane number. For example, it may be desirable to limit the extent of conversion obtained in order to obtain a product of the desired octane number. The effect of the extent of conversion on the octane number of the product is particularly noticeable in connection with the treatment of gaseous mixtures containing both normal butenes and iso-butenes. For example, in the treatment of a mixture of normal and iso-butenes by means of the new catalyst at a temperature such as that mentioned above it is found that conversion of the iso-butene proceeds more rapidly than conversion of the normal butenes whereby by limiting the time of contact of the charge with the catalyst to a predetermined figure it is possible to effect preferential conversion of the iso-butene and thus obtain a product of higher octane number.

*Example III*

An example of the effect of limiting the time of contact in the treatment of a mixture of normal and iso-butenes with a new catalyst may be had by reference to operations on a gas charge consisting of 60.4% butane, 27.9% normal butene and 11.3% iso-butene at a temperature of 325° F. and a pressure of 1400 pounds per square inch. When the gas charge was passed over the catalyst at a rate of 31.6 cubic feet measured as gas at standard conditions of temperature and pressure, per pound of catalyst per hour, a polymer product was obtained equivalent to 196% of the iso-butene in the charge. The gas product consisted of 81.2% butane, 18.5 normal butene and 0.3% iso-butene. When the charge was passed over the catalyst at the said operating conditions with a higher space velocity, that is, 59.9 cubic feet of charge, measured as gas under standard conditions of temperature and pressure, per pound of catalyst per hour, the extent of conversion was less than that obtained with the low space velocity of charge, that is, the equivalent of 158% of the iso-butene in the feed. The gas product obtained with the higher space velocity of charge consisted of 74.4% butane, 23.8% normal butene and 1.8% iso-butene.

The moisture content of the reaction gas mixture apparently has no direct effect on the reaction. However, in order to avoid a possible softening effect on the catalyst pellets with resulting possible pressure drop increases in the reaction chamber and similar operating difficulties it may be desirable that the reaction gas be substantially dry.

The employment in the process of the invention of the copper pyrophosphate catalyst is advantageous in that it permits a production of polymer per unit cost of catalyst material which is substantially in excess of that obtained heretofore in other processes directed to the catalytic polymerization of olefin hydrocarbons. For example, under the conditions above described the catalyst body has been employed continuously without revivification for a length of run equivalent to the production of approximately 130 gallons of polymer product per pound of catalyst employed without apparent deterioration of the catalyst or loss of activity. The process is advantageous also in that it involves the use of a catalyst which is free from phosphoric acids. The catalyst employed in the process is very stable, is less susceptible to deactivation during use than phosphoric acid catalysts thus permitting longer runs without revivification, is not susceptible to dehydration during use, and may be revivified more easily and with less danger of destruction than phosphoric acid catalysts.

I claim:

1. The method of converting olefinic hydrocarbons to hydrocarbons of higher boiling points by polymerization thereof which comprises contacting said olefinic hydrocarbons at elevated temperature with a catalytic contact agent comprising as an essential ingredient copper pyrophosphate.

2. The method of converting olefinic hydrocarbons to hydrocarbons of higher boiling points by polymerization thereof which comprises passing a stream of hydrocarbons comprising olefinic hydrocarbons over a catalytic contact agent comprising copper pyrophosphate as an essential ingredient, gradually increasing the temperature of the contact agent and the reaction gases in contact therewith to a maximum temperature substantially greater than that ultimately necessary for optimum conversion of the olefins to the desired product to initiate conversion of the olefins to higher boiling polymers at a substantial rate, and thereafter lowering the temperature of the contact agent and the reaction gases in contact therewith to the optimum temperature for maximum conversion of the olefins to the desired product.

3. The method of converting olefinic hydrocarbons to hydrocarbons of higher boiling points by polymerization thereof which comprises passing a stream of hydrocarbons comprising olefinic hydrocarbons in contact with a catalytic contact agent comprising copper pyrophosphate as an essential ingredient, gradually raising the temperature of the contact agent and the reaction gases in contact therewith to a maximum of approximately 500° F. to initiate conversion of the olefin constituents of said reaction gases to higher boiling polymers at a substantial rate, lowering the temperature of the contact agent and the reaction gases in contact therewith from said maximum to an operating temperature of approximately 325-350° F., and continuing the passage of said hydrocarbon stream over said contact agent at said operating temperature to effect maximum conversion of the olefin constituents thereof to the desired product with minimum production of undesired polymer products.

4. The method of treating a mixture of hydrocarbons comprising both normal olefins and iso-olefins to effect conversion of a portion thereof to hydrocarbons of higher boiling points within the gasoline boiling range by polymerization thereof which comprises contacting said mixture of hydrocarbons at elevated temperature with a catalytic contact agent comprising as an essential ingredient copper pyrophosphate and limiting the extent of conversion of said hydrocarbons to higher boiling products to obtain a gasoline product of relatively high octane number.

5. The method of treating a mixture of hydrocarbons comprising normal butenes and isobutenes to effect polymerization of a portion of said butenes to products within the gasoline boiling range which comprises contacting said hydrocarbon mixture at elevated temperature with a catalytic contact agent comprising as an essential ingredient copper pyrophosphate, and limiting the extent of conversion of said butenes to obtain a gasoline product of relatively high octane number.

6. The method of treating a mixture of hydrocarbons comprising both normal olefins and iso-olefins to effect conversion of a portion thereof to hydrocarbons of higher boiling points within the gasoline boiling range which comprises contacting said hydrocarbon mixture at elevated temperature with a catalytic contact agent comprising as an essential ingredient copper pyrophosphate and limiting the time of contact of said olefins with said catalyst to effect preferential polymerization of iso-olefins to obtain a gasoline product of relatively high octane number.

7. The method of converting olefinic hydrocarbons to hydrocarbons of higher boiling point by polymerization thereof which comprises contacting said olefinic hydrocarbons at elevated temperature with a catalytic contact agent comprising as an essential ingredient copper pyrophosphate prepared by precipitating said copper pyrophosphate in an aqueous solution of a soluble copper salt by means of a soluble metal pyrophosphate, said metal pyrophosphate being employed in an amount in excess of the amount equivalent to the amount of said soluble copper salt in said solution.

8. The method of converting olefinic hydrocarbons to hydrocarbons of higher boiling points which comprises contacting said olefinic hydrocarbons with copper pyrophosphate under conditions of temperature, pressure and time suitable to effect said conversion.

ROBERT F. RUTHRUFF.